Figure 1:
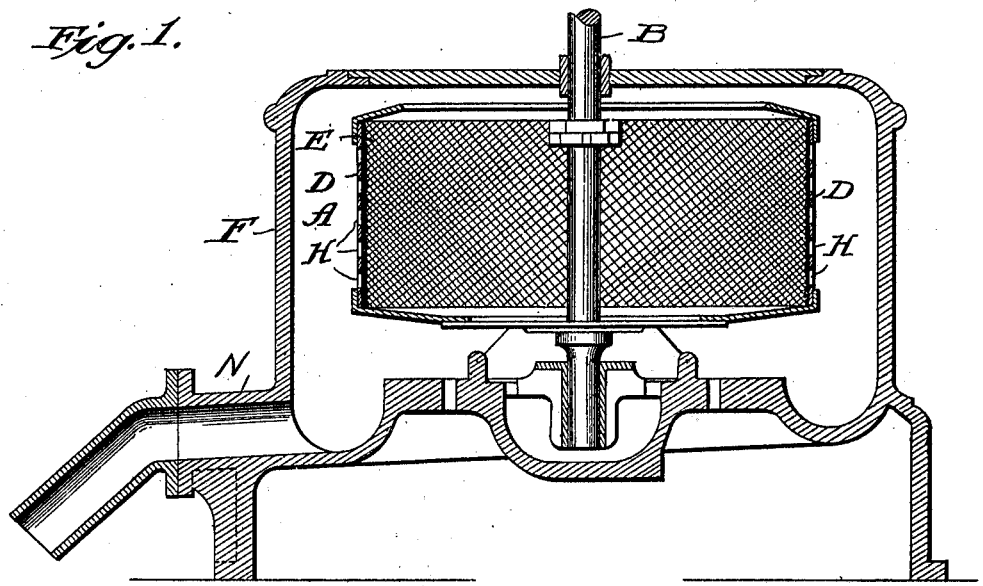

J. I. SOLOMON.
PROCESS FOR EXTRACTING PEARLS FROM OYSTERS.
APPLICATION FILED NOV. 17, 1909.

989,072.

Patented Apr. 11, 1911.

Witnesses

Inventor
John I. Solomon
By
Attorney

UNITED STATES PATENT OFFICE.

JOHN I. SOLOMON, OF NEW YORK, N. Y.

PROCESS FOR EXTRACTING PEARLS FROM OYSTERS.

989,072.     Specification of Letters Patent.     Patented Apr. 11, 1911.

Application filed November 17, 1909. Serial No. 528,600.

*To all whom it may concern:*

Be it known that I, JOHN I. SOLOMON, a citizen of the United States, residing at New York, in the county of New York and State of New York, have invented certain new and useful Improvements in Processes for Extracting Pearls from Oysters; and I do hereby declare the following to be a full, clear, and exact description of the invention, such as will enable others skilled in the art to which it appertains to make and use the same.

My invention relates to the art of extracting pearls from oysters. Its object is to provide a method for extracting pearls from pearl-bearing mussels, oysters, and other pearl-bearing shell-fish, especially where it is necessary to handle such shell-fish in large numbers and where it is necessary to guard against losses by theft.

My invention involves, essentially, impelling the pearl-bearing meat against a structure which will disintegrate and sub-divide it, discharging the meat and retaining the pearls.

In my preferred mode of practicing this invention I employ centrifugal force for impelling the pearl-bearing meat against screens, gratings, or similar sub-dividing or disintegrating structures and in some instances I find it advantageous to employ either as an adjunctive medium or as an impelling force air, steam, or other gases, or water or other liquids.

Pearls which grow in the flesh or meat of pearl-bearing shell-fish are so embedded as to make their extraction a matter of great difficulty. The meat of pearl-bearing shell-fish is of a gristly nature, slippery and moist. The pearls are also slippery when moist and are of almost the same color as the meat of the oyster and are of very small size compared to the bulk of the oyster. These circumstances add to the difficulty of finding and removing the pearls, as it is difficult in any case to even see or feel the pearls in place in the oyster. When the pearls are of small size it is practically impossible to see them in the treatment of the oyster by hand or in the customary manner, and there is, therefore, a great waste when the pearls are thus extracted from the oysters individually, especially when the oysters have been freshly fished. In any event, the manual treatment of individual oysters in large numbers is laborious, and in many instances it is practically impossible. As has been indicated the manual treatment of oysters also offers facilities for theft.

In order to overcome the above-named difficulties, and especially to facilitate the handling of pearl-bearing oysters in quantities, I place the pearl-bearing meat in an apparatus comprising as its essential element a centrifugal, and by the action of the centrifugal I remove the meat by expelling it through openings in the sides of the centrifugal, leaving the pearls behind. I have also devised a supplemental process by which I introduce air, steam or other gases under pressure, or I may use water or other liquids in lieu of the gaseous pressure.

The use of air or other gases under pressure, or of water or other liquids, in the centrifugal facilitates the removal of the meat from the pearl and flushes the centrifugal so as to entirely remove any stringy or gristly shreds of the meat which may obstruct the parts of the apparatus or the exits thereof.

Figure 2:
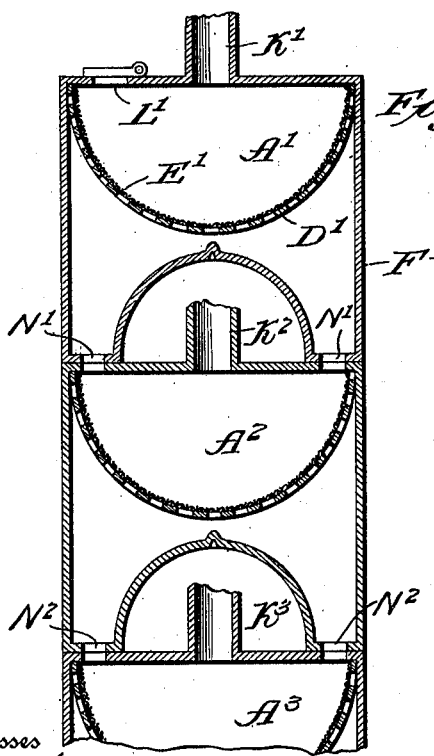
Figure 3:
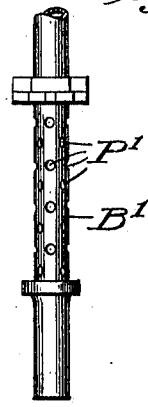

In the drawings which illustrate an apparatus which may be used in carrying out my process: Figure 1 is a central vertical section; Fig. 2 is a vertical section of a modification; and Fig. 3 is a detail showing a modification of the journal of Fig. 1, that is, showing it hollow and perforated for the admission of air, steam or other gases, or water or other liquids to the apparatus of Fig. 1.

In these drawings A represents a containing vessel which may be made of any suitable material such as wood, metal, or any combination thereof, and adapted to receive the meat of pearl-bearing oysters. The vessel A is borne and revolved by means of a shaft B journaled in the bottom and top of a frame F inclosing and forming an enveloping chamber for the vessel A. The walls D of the vessel A are perforated at H in a manner well understood, or instead of the perforations in the sides or walls of the vessel there may be a netting in the vessel or a grid or any other convenient means for disintegrating the meat torn or separated from the pearls.

Screens which may be used in connection with the orifices or independently thereof, are indicated at E. The only essential detail in this respect is that in any case the openings shall be of a size to prevent objects the size of the pearl which is to be retained from passing through the screen.

N represents a pipe through which the eliminated meat may be discharged.

When the vessel A is filled with the meat of the oyster and power is transmitted to the shaft B the revolving vessel will impart a centrifugal force to the mass of oyster meat in the vessel and will carry the meat over against the sides D of the vessel and eventually force the meat through the screen E when it is used, and, in any event, through the orifices H, or through whatever form of perforations the sides of the vessel A may have. The pearls being of a hard and unyielding substance and of a size too large to pass through the openings in the side of the vessel A, will be retained in the vessel after all the flesh of the oyster has been eliminated and discharged.

As the pearls in any mass of oyster meat will vary in size from those as small or smaller than grains of sand upward to those of considerable bulk it may not be found expedient or possible to extract all at one operation. To accomplish a successive treatment and to expedite the operation I may have different grades of screens E so that at the first operation, for instance, I may remove all of the meat and the smaller sizes of the pearls, leaving behind in the vessel the larger pearls. Then, having removed the larger pearls from the vessel A, I substitute for the screen previously used, some of finer mesh and then replace in the vessel A the mass of meat and smaller pearls which had previously been discharged through the coarser screens. The second operation then will eliminate the meat leaving behind the next grade of pearls. This process can be continued successively until all the pearls to the finest grades have been extracted from the meat of the oysters. This process may be made successive and at the same time continuous by having a battery of centrifugals arranged to treat in succession the pearl-bearing meat, that is, by having the first mass of meat and pearls discharged through the comparatively coarse screen of the first centrifugal and then having the discharged mass of meat and smaller pearls at once placed in the second centrifugal and so on through the battery so that the operation of all the centrifugals, and therefore the extraction of the different sizes of pearls, shall be practically simultaneous. The apparatus illustrated in Fig. 2 does not require the use of a centrifugal.

In Fig. 2 $A^1$ represents a vessel having a bottom and grating or screen corresponding to those previously described and herewith illustrated as $D^1$, $E^1$. $F^1$ illustrates the inclosing chamber. $L^1$ is an opening in the top of the vessel $A^1$ through which the pearl-bearing meat is placed in the vessel, and $K^1$ is a pipe through which the gaseous or liquid medium to be employed to treat the pearl-bearing meat is introduced. Below the vessel $A^1$ are succeeding vessels of the same description, $A^2$, $A^3$, each having an adjunctive pipe for the treating medium, $K^2$, $K^3$, and each having openings in the top $N^1$, $N^2$ through which the meat and smaller grades of pearls are received as they are discharged from the preceding extracting vessel. This apparatus of Fig. 2 illustrates a convenient battery for continuous successive extraction. In the first vessel $A^1$ the larger pearls will remain while the smaller pearls and eliminated meat will pass through the comparatively coarse screen. In the second vessel $A^2$ the next grade of pearls will be caught, the still smaller grades of pearls again passing through with the meat into the next chamber, and so on until the process is completed. In some instances a single feed pipe for the medium such as air, steam or other gases, or water or other liquids, may be sufficient, but I have indicated branch pipes to augment the flow as illustrating more active and effective apparatus. Instead of passing the gases under pressure in the apparatus shown in Fig. 1 through a vessel A or successive vessels $A^1$, suction may be applied in any convenient manner to the outside of the vessel and water or other liquid and air or other gases drawn through the vessel to eliminate the meat. This may be done by hermetically sealing the vessel A in its enveloping chamber F and applying a suction at the discharge opening N. Or gases or liquids may be passed through the vessel under pressure and suction at the same time. When steam is employed the outflowing mass of matter may be passed through a condenser and the pressure and the flow within the vessel A be thus increased. Obviously, suction may in the same manner be applied to the successive vessels illustrated in Fig. 2 of the apparatus.

The use of air, steam or other gases, or water or other liquids, as has already been indicated, may be carried out in the apparatus shown in Fig. 1 by substituting for the shaft B the hollow shaft $B^1$ with the perforations $P^1$ illustrated in Fig. 3. The use of this is obvious from the illustration, and either pressure or suction may be employed with this modification, and in case of steaming the outlet end may be connected to a condenser.

By illustrating and describing the apparatus for carrying out this process, I do not intend to limit the application of my process to any particular mechanical means. I have used the term "oyster" as a convenient term to designate thus briefly all pearl-bearing mussels, oysters and other pearl-bearing shell-fish.

I claim:

1. The process of extracting pearls from pearl-bearing mussels, oysters or other pearl-bearing shell-fish, which consists in impelling the pearl-bearing meat against a sub-dividing or disintegrating structure.

2. The process of extracting pearls from pearl-bearing mussels, oysters or other pearl-bearing shell-fish, which consists in subjecting the pearl-bearing meat to the action of centrifugal force, substantially as and for the purpose set forth.

3. The process of extracting pearls from pearl-bearing mussels, oysters or other pearl-bearing shell-fish, which consists in subjecting the pearl-bearing meat to the combined action of centrifugal force and a flushing and disintegrating medium.

4. The process of extracting pearls from pearl-bearing mussels, oysters or other pearl-bearing shell-fish, which consists in subjecting the relatively soft meat carrying the embedded pearl to the action of centrifugal force impelling the pearl-bearing meat against a sub-dividing or disintegrating structure.

In testimony whereof I have hereunto signed my name in the presence of two subscribing witnesses.

JOHN I. SOLOMON.

Witnesses:
JOHN M. DALE,
WALTER I. HESS.

Copies of this patent may be obtained for five cents each, by addressing the "Commissioner of Patents, Washington, D. C."